United States Patent
Chawla et al.

[11] Patent Number: 5,496,870
[45] Date of Patent: Mar. 5, 1996

[54] CURABLE LIQUID RESIN COMPOSITION

[75] Inventors: Chander P. Chawla, Batavia, Ill.; Tohru Ohtaka, Kawasaki, Japan; Shinichirou Iwanaga, Yokkaichi, Japan; Tsuyoshi Watanabe; Katsutoshi Igarashi, both of Yokohama, Japan

[73] Assignee: DSM, Elgin, Ill.

[21] Appl. No.: 361,449

[22] Filed: Dec. 21, 1994

Related U.S. Application Data

[63] Continuation of Ser. No. 78,557, Jun. 16, 1993, abandoned, which is a continuation of Ser. No. 779,344, Oct. 18, 1991, abandoned.

[30] Foreign Application Priority Data

Oct. 19, 1990 [JP] Japan .................... 2-281092

[51] Int. Cl.$^6$ .................... C08G 18/48; C08G 18/67; G02B 6/02
[52] U.S. Cl. .................... 522/90; 522/96; 522/97; 528/75; 385/145; 385/123
[58] Field of Search .................... 522/90, 96, 97; 528/75; 385/123, 145

[56] References Cited

U.S. PATENT DOCUMENTS

| | | | |
|---|---|---|---|
| 4,309,526 | 1/1982 | Baccei | 528/75 |
| 4,446,286 | 5/1984 | Kolycheck et al. | 525/455 |
| 4,629,287 | 12/1986 | Bishop | 522/96 |
| 4,806,574 | 2/1989 | Krajewski et al. | 522/96 |
| 4,812,489 | 3/1989 | Watanabe et al. | 522/42 |
| 4,992,524 | 2/1991 | Coady et al. | 528/75 |

FOREIGN PATENT DOCUMENTS

| | | |
|---|---|---|
| 1063278 | 3/1967 | United Kingdom . |
| WO91/03499 | 9/1990 | WIPO . |

*Primary Examiner*—Susan W. Berman
*Attorney, Agent, or Firm*—Dressler, Goldsmith, Shore & Milnamow, Ltd.

[57] ABSTRACT

A curable liquid resin composition comprising a urethane (meth)acrylate polymer obtained by reacting:

(A) a polyol compound containing as structural units groups which are represented by formulae $-CH_2CH_2O-$ or $-CH_2CH(CH_2CH_3)O-$;

(B) a polyisocyanate compound; and (C) at least one (meth)acrylate compound containing a hydroxyl group and coated articles produced therefrom.

16 Claims, No Drawings

CURABLE LIQUID RESIN COMPOSITION

This is a continuation, of application Ser. No. 08/078,557 filed on Jun. 16, 1993, now abandoned which is a continuation of Ser. No. 07/779,344, filed Oct. 18, 1991 now abandoned.

FIELD OF THE INVENTION

The present invention relates to a curable liquid resin composition which has superior curing characteristics, durability, resistance to heat aging and ultraviolet light and the like, adheres well to various types of substrates, and is therefore useful as a coating material for plastics, wood, porcelain, glass, paper, and the like, and as an optical molding material, three-dimensional molding material, printing plate material, and the like.

BACKGROUND OF THE INVENTION

Generally, with the object of protecting and reinforcing the bare optical fiber threads, an optical fiber is provided with a resin coating comprising a flexible primary coating layer on the surface of the optical fiber immediately after hot melt spinning of the glass fiber, and a flexible secondary coating layer which covers the surface of the primary coating layer. The coating material used to form these coatings must have the following characteristics:

(1) be a liquid at room temperature and have high processability;
(2) provide good productivity at a high curing rate;
(3) show superior flexibility;
(4) exhibit very little physical change during temperature changes over a wide range;
(5) have superior thermal resistance such as resistance to heat and thermal aging and superior resistance to hydrolysis;
(6) show superior long term reliability and little physical change with passing time;
(7) show superior resistance to chemicals such as acids and alkalis;
(8) exhibit low moisture absorption; and
(9) exhibit superior light resistance including resistance to ultraviolet light.

With respect to these requirements, various types of radiation-curable liquid coating materials have been developed, for example, materials containing urethane acrylates using a tetrahydrofuran-ethyleneoxide ring-opening copolymer (Japanese Laid-Open Patent Application No. 86450/1986), a tetrahydrofuranpropyleneoxide ring-opening copolymer (Japanese Laid-Open Patent Application No. 181170/1985), or a tetrahydrofuranalkyltetrahydrofuran copolymer (Japanese Laid-Open Patent Application No. 115964/1989).

However, in the case where these polyether-type copolymers are used, there are existing drawbacks which must be overcome. Specifically, if a tetrahydrofuranethyleneoxide ring-opening copolymer is used, there are problems with water absorption, heat resistance, hot water resistance, and lack of required flexibility because crystalline characteristics remain. If a tetrahydrofuran-propyleneoxide ring-opening copolymer is used, there are problems with respect to heat resistance, ultraviolet ray resistance, and hot water resistance. If a tetrahydrofuran-alkyltetrahydrofuran copolymer is used, the heat resistance, ultraviolet ray resistance, and hot water resistance are good, but the required flexibility is lacking because crystalline characteristics remain. Therefore, these materials do not adequately provide the characteristics required for coatings of optical fibers.

Accordingly, an object of the present invention is to provide, with due consideration to the drawbacks of such conventional compositions, a curable liquid resin composition for use as a covering material for optical fibers, which has a low viscosity at room temperature and exhibits good processability when used to cover optical fibers, has good optical curing characteristics, can accommodate high speed optical fiber production, and, in the cured state, shows excellent flexibility, possesses superior resistance to heat, ultraviolet light, and oil, produces only small amounts of hydrogen gas, and exhibits suitable adherence to optical fiber.

SUMMARY OF THE INVENTION

The present invention is directed to a curable liquid resin composition comprising a urethane (meth)acrylate polymer obtained by reacting:

(A) a polyol compound containing as structural units groups which are represented by formulae (I) and (II)

$$-CH_2CH_2O-  \qquad (I)$$

$$-CH_2CH(CH_2CH_3)O-  \qquad (II)$$

(B) a polyisocyanate compound; and
(C) at least one (meth)acrylate compound containing a hydroxyl group.

The present invention is also directed to coated articles comprising a substrate having a coating comprising the above composition and a method of preparing a coated article comprising applying said composition to a substrate and exposing said composition to a dose of radiation that is sufficient to cure said composition.

DETAILED DESCRIPTION OF THE INVENTION

The polyol compound (A) used in the present invention must contain the structural units which are represented by formulae (I) and (II). There are no particular restrictions on the polymerization form of these structural units; they may be randomly polymerized, block polymerized, or graft polymerized. This type of polyol compound (A) can be produced, for example, by a ring-opening polymerization of ethylene oxide and 1,2-butylene oxide using any commonly known method.

It is desirable to have from about 2 to about 50 weight (hereinafter simply %) of the structural unit represented by formula (I) included in the polyol compound (A), while from about 4 to about 30% is particularly desirable. If the proportion is less than about 2%, the improvement in the resistance of the cured composition to oil is small; if greater than about 50%, there is a tendency of a decrease in the water resistance and the flexibility of the cured composition. A desirable proportion of the structural unit represented by formula (II) included in the polyol compound (A) is from about 20 to about 98%, with a particularly preferable range being from about 40 to about 96%.

The number average molecular weight of the polyol compound (A) is usually in the 200 to 10,000 range; but 500 to 5,000 is preferable. If the number average molecular weight is less than 200, the Young's modulus of the cured composition at room temperature and low temperatures increases, resulting in an increase in the transmission losses from side pressure when the composition is applied to optical fiber. A number average molecular weight of the polyol compound (A) greater than about 10,000, on the other hand, increases the viscosity of the resulting composition, which gives rise to a tendency for the coatability characteristics to decrease when the composition is coated on optical fiber.

The polyol compound (A) used in the present invention may contain structural units other than the groups represented by formulas (I) and (II) in a range in which the effect of the present invention is not lost, so long as the essential structural units of formulas (I) and (II) are contained. Examples of such other structural units which may be added include groups: —$CH_2CH_2CH_2O$—, —$CH_2CH(CH_3)O$—, —$CH_2CH_2CH_2CH_2CH_2O$—, and —$CH_2CH(CH_3)CH_2CH_2O$—.

Polyol compounds other than the polyol compound (A) may be used with polyol compound (A). Examples which can be given of such polyol compounds include polyether polyols, polyester polyols, polycarbonate polyols, polycaprolactam polyols, and other polyols which do not contain the groups represented by formulae (I) and (II) as structural units.

Specific examples of polyether polyols which do not contain the groups represented by formulas (I) and (II) as structural units are polyethylene gylcol, 1,2-polypropylene glycol, 1,3-polypropylene glycol, polytetramethylene glycol, 1,2-polybutylene glycol, polyisobutylene glycol, copolymers of ethylene oxide and tetrahydrofuran, copolymers of methyltetrahydrofuran and tetrahydrofuran, and the like.

Examples which can be given of polyester polyols include polyester polyols obtained by reacting a polyvalent alcohol such as ethylene glycol, polyethylene glycol, propylene glycol, polypropylene glycol, tetramethylene glycol, polytetramethylene glycol, 1,6-hexanediol, neopentyl glycol, 1,4-cyclohexanedimethanol, 3-methyl-1,8-octanediol, and the like, with a polybasic acid, such as phthalic acid, isophthalic acid, terephthalic acid, maleic acid, fumaric acid, adipic acid, sebacic acid, and the like; and commercial products such as KURAPOL P-2010, PMIPA, PKA-A, PKA-A2, PNA-2000, and the like manufactured by Kuraray Co., Ltd.

Examples of polycarbonate polyols are 1,6-hexane polycarbonate and products available on the market, such as DN-980, DN-981, DN-982, and DN-983 (all manufactured by Japan Polyurethane Co., Ltd.), and PC-8000 (manufactured by PPG), and the like.

Examples of polycaprolactone polyols are polycaprolactonediols obtained by reacting ε-caprolactone with a divalent diol, such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexane dimethanol, 1.4-butanediol, and the like. Other examples of polycaprolactone polyols which can be given are products available on the market, such as PRAXEL 205, 205AL, 212, 212AL, 220, and 220AL, manufactured by Daicel Co., Ltd.

Examples of other polyols are ethylene glycol, propylene glycol, 1,4-butanediol, 1,5-pentanediol, 1,6-hexanediol, neopentyl glycol, 1,4-cyclohexane dimethanol, bisphenol-A, bisphenol-F, hydrogenated bisphenol-A, hydrogenated bisphenol-F, alkyleneoxide-addition diols to bisphenol-A, alkyleneoxide-addition diols to bisphenol-F, dimethylol compounds of dicyclopentadiol, tricyclodecane dimethanol, poly-β-methyl-δ-valerolactone with a hydroxy terminal group, hydrogenated polybutadiene with a hydroxy terminal group, hydrogenated polybutadiene with a hydroxy terminal group, castor-oil modified polyols, diol compounds with a polydimethylsiloxane terminal group, polyols modified with polydimethylsioxane carbitol, and the like.

The number average molecular weight of these polyol compounds is usually in the 200 to 10,000 range; while 500 to 5,000 is preferable.

Examples of the polyisocyanate compound (B) of the present invention include 2,4-tolylenediisocyanate, 2,6-tolylenediisocyanate, 1,3-xylylenediisocyanate, 1,4-xylylenediisocyanate, 1,5-naphthalenediisocyanate, m-phenylenediisocyanate, p-phenylenediisocyanate, 3,3'-dimethyl-4,4'-diphenylmethanediisocyanate, 3,3'-dimethylphenylenediiso 4,4'-biphenylenediisocyanate, 1,6-hexanediisocyanate, bis(2-isocyanateethyl)-fumarate, 6-isopropyl-1,3-phenyldiisocyanate, 2,2-bis-4'-propaneisocyanate, lysinediisocyanate, and the like. Of these, 2,4-totlylenediisocyanate, isophoronediisocyanate, and 2,2,24-trimethylhexamethylenediisocyanate are preferable.

Specific examples of the (meth)acrylate compound containing a hydroxyl group which is the monomer component (C) of the present invention are 2-hydroxyethyl(meth)acrylate, 2-hydroxypropyl(meth)acrylate, 2-hydroxybutyl(meth)acrylate, 2-hydroxy-3-phenyloxypropyl(meth)acrylate, 1,4-butanediolmono(meth)acrylate, 2-hydroxyalkyl(meth)acryloyl phosphate, 4-hydroxycyclohexyl(meth)acrylate, 1,6-hexanediolmono(meth)acrylate, neopentylglycolmono(meth)acrylate, trimethylolpropanedi(meth)acrylate, trimethylolethanedi(meth)acrylate, pentaerythritoltri (meth) acrylate, dipentaerythritolpenta(meth)acrylate, and (meth) acrylates represented by formula (III),

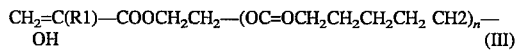

$$CH_2=C(R1)—COOCH_2CH_2—(OC=OCH_2CH_2CH_2CH_2 CH_2)_n— \\ OH \qquad (III)$$

wherein $R^1$ is a hydrogen atom or a methyl group; and n- is an integer from 1 to 15, preferably, from 1 to 4.

Other examples which can be given include compounds obtained by an addition reaction of a compound containing a glycidyl group, such as alkylglycidyl ether, arylglycidyl ether, glycidyl(meth)acrylate, and the like, with a (meth)acrylic acid. Among such compounds, 2-hydroxyethyl(meth)acrylate and 2-hydroxypropyl(meth)acrylate, and the like, are particularly desirable.

Urethane (meth)acrylate polymers which are used in the present invention are prepared by reacting the above-mentioned polyol compound (A), the polyisocyanate compound (B), and the (meth)acrylate compound containing a hydroxyl group (C). Specifically, this is carried out by reacting the isocyanate group of the isocyanate compound (B) with the hydroxyl group of the polyol compound (A) and with the hydroxyl group of the (meth)acrylate compound containing a hydroxyl group (C) respectively.

Examples of methods by which this reaction can be carried out are:

(1) A method wherein the polyol compound (A), the polyisocyanate compound (B), and the (meth)acrylate compound containing a hydroxyl group (C) are all charged and reacted together;

(2) A method wherein the polyol compound (A) and the polyisocyanate compound (B) are reacted together and then reacted with the (meth)acrylate compound containing a hydroxyl group (C);

(3) A method wherein the polyisocyanate compound (B) and the (meth)acrylate compound containing a hydroxyl group (C) are reacted together and then reacted with the polyol compound (A); and (4) A method wherein the polyisocyanate compound (B) and the (meth)acrylate compound containing a hydroxyl group (C) are reacted together and then reacted with the polyol compound (A), and finally the product is again reacted with the (meth)acrylate compound containing a hydroxyl group (C).

The respective amounts of the polyol compound (A), the polyisocyanate compound (B), and the (meth)acrylate compound containing a hydroxyl group (C) which are used are, preferably, 1.1 to 3 equivalents by weight of the isocyanate group contained in the polyisocyanate compound (B) and 0.1 to 1.5 equivalents by weight of the hydroxyl group (C), to one equivalent by weight of the hydroxyl group contained in the polyol compound (A).

In addition, 0.01 to 1.0 parts by weight of a urethanation catalyst such as copper naphthenate, cobalt naphthenate, zinc naphthenate, n-butyltinlaurate, triethylamine, triethylenediamine, 2-methyltriethylenediamine, and the like, are generally used to 100 parts by weight of the total reactants used in these reactions. The reaction temperature is normally 10 to 90° C., and preferably 30° to 80° C.

The number average molecular weight of the urethane (meth)acrylate polymer contained in the composition of the present invention is usually in the 700 to 20,000 range; but 1,000 to 10,000 is preferable.

Radiation-curable polymers other than a urethane (meth)acrylate polymer, as well as reaction dilution agents and other additives, may also be added, as required to the curable liquid resin composition of the present invention in a range in which the effect of the present invention is not lost.

Examples of these other radiation-curable polymers which can be given include urethane (meth)acrylates other than the urethane (meth)acrylate polymers already given, polyester (meth)acrylates, epoxy (meth)acrylates, polyamide (meth)acrylates, polysiloxanes with a (meth)acryloyloxy group, and the like.

Monofunctional compounds and polyfunctional compounds can be used as reaction dilution agents. Examples of monofunctional compounds which can be given include 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)acrylate, isopropyl(meth)acrylate, butyl(meth)acrylate, amyl(meth)acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl(meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth)acrylate, octadecyl(meth)acrylate, stearyl(meth)acrylate, tetrahydrofurfuryl(meth)acrylate, butoxyethyl(meth)acrylate, ethoxydiethylene glycol (meth)acrylate, benzyl(meth)acrylate, cyclohexyl(meth)acrylate, phenoxyethyl(meth)acrylate, polyethylene glycol mono(meth)acrylate, polypropylene glycol mono(meth)acrylate, methoxyethylene glycol (meth)acrylate, ethoxyethoxyethyl(meth)acrylate, methoxypolyethylene glycol (meth)acrylate, methoxypolypropylene glycol (meth)acrylate, dicyclopentadiene(meth)acrylate, dicyclopentanyl(meth)acrylate, tricyclodecanyl(meth)acrylate, isobornyl(meth)acrylate, bornyl(meth)acrylate, diacetone(meth)acrylamide, isobutoxymethyl(meth)acrylamide, N-vinylpyrrolidone, N-vinylcaprolactam, N,N-dimethyl(meth)acrylamide, t-octyl(meth)acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N'-dimethyl-aminopropyl(meth)acrylamide, (meth)acryloylmorphorine; vinyl ethers such as hydroxybutyl vinyl ether, lauryl vinyl ether, cetyl vinyl ether, and 2-ethylhexyl vinyl ether; maleic acid esters; fumaric acid esters; and compounds represented by the following formulae (IV) to (VI).

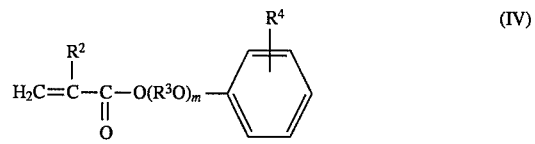

wherein $R^2$ indicates a hydrogen atom or a methyl group; $R^3$ is an alkylene group with 2 to 6, preferably 2 to 4, carbon atoms; $R^4$ is a hydrogen atom or an alkyl group with 1 to 12, preferably 1 to 9, carbon atoms, and m is an integer from 0 to 12, preferably from 1 to 8.

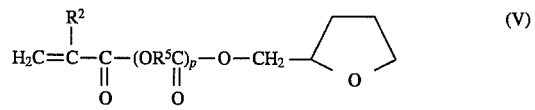

wherein $R^2$ is the same as above, $R^5$ is an alkylene group with 2 to 8, preferably 2 to 5, carbon atoms, and p is an integer from 1 to 8, preferably from 1 to 4.

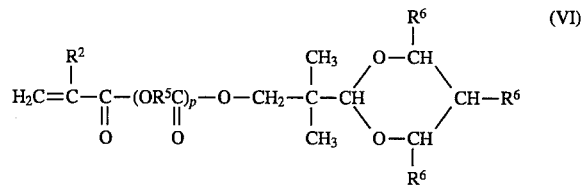

wherein $R_2$, $R_5$, and p are the same as above, and $R_6$ is a hydrogen atom or a methyl group.

Examples of commercial products which can be used are ARONIX M111, M113, M114, M117, (manufactured by Toagosei Chemicals), KAYARAD TC110S, R629, R644 (manufactured by Nippon Kayaku) and BISCOAT 3700 (manufactured by Osaka Organic Chemicals) and the like.

Examples of multifunctional compounds include trimethylolpropanetri(meth)acrylate, pentaerythritoltri(meth)acrylate, ethylene glycol di(meth)acrylate, 1,6-hexanediol di(meth)acrylate, trimethylolpropanetrioxyethyl(meth)acrylate, tricyclodecanedimethanoldiacrylate, tris(2-hydroxyethyl)isocyanurate tri(meth)acrylate, tris(2-hydroxyethyl)isocyanurate di(meth)acrylate, tricyclodecanedimethanol di(meth)acrylate, epoxy(meth)acrylates which are (meth)acrylate addition compounds of diglycidyl ethers of bisphenol-A, triethylene glycol divinyl ether, and the like. Examples of commercial products which can be used are COPIMA-UV, 5A1002, SA2007 (manufactured by Mitsubishi Petrochemicals), BISCOAT 700 (manufactured by Osaka Organic Chemicals), KAYARAD R604, DPCA-20, DPCA-30, DPCA-120, HX-620, d-310, d-330 (manufactured by Nippon Kayaku), ARONIX M210, M215, M315, M325, (manufactured by Toagosei Chemicals), and the like.

Of the above-mentioned reaction dilution agents, particularly preferable are (meth)acrylate compounds having a residual alcohol group in an ester structure with seven or more, and preferably 10 to 100, carbon atoms and monovalent or divalent groups with an acyclic structure (hereinafter: acyclic groups) or both cyclic and acyclic groups, of which the homopolymers have a glass transition point of −10° C. or below. The acyclic groups may contain a structure with ether bonds, as in the following formula (VII), and ester bonds as in the following formula (VIII), and may also have amino groups constructing amide bonds, thioether bonds, sulfoxide bonds, and the like.

$$-(R^7-O)_q \qquad \qquad (VII)$$

wherein $R^7$ is an alkylene groups with 2 to 6 carbon atoms, and q is an integer from 3 to 16.

$$-(O-R^8-CO)_r-O-R^9- \qquad (VIII)$$

wherein $R^8$ and $R^9$ are alkylene groups with 2 to 7 carbon atoms, and r is an integer from 1 to 15.

The molecular weights of these (meth)acrylate compounds are generally in the 200 to 3000 range. Specific examples of particularly desirable (meth) acrylate compounds include the commercial products ARONIX M111, M113, M114, M117, (manufactured by Toagosei Chemicals), KAYARAD TC11)S, R629, R644 (manufactured by Nippon Kayaku). The use of these (meth)acrylate compounds improve the flexibility of the cured product and also improve the flexibility at low temperatures.

It is possible to improve the curing speed of the resulting composition by using two or more types of these (meth)acrylate compounds in combination. The (meth)acrylate compounds make up 5 to 60%, and preferably 10 to 40% of the composition of the present invention. If less than 5%, the Young's modulus of the cured composition at low temperatures increases so that there is a tendency for the transmission losses to increase when the composition is applied to optical fibers; if greater than 60%, there is a tendency for the curing characteristics of the composition to deteriorate.

Furthermore, when the reaction dilution agents N-vinylpyrrolidone and N-vinlycaprolactam are used, there is a desirable improvement in the adhesion characteristics and curing characteristics of the resulting compositions. The amount of these agents used is preferably 2 to 20%, and ideally 3 to 15% of the composition. If this amount exceeds 20%, the water absorption ratio of the cured composition increases, and the water resistance and alkali resistance decrease, and there is a tendency for the flexibility to deteriorate at low temperatures.

The composition of the present invention is cured by heat and/or radiation. Radiation in this case means the application of infrared, visible light, and ultraviolet rays, as well as ionized rays such as X-rays, electron beam, α-rays, β-rays, γ-rays, and the like.

When the composition of the present invention is heat cured, a radical polymerization initiator is generally used. Examples of radical polymerization initiators which can be given include azo compounds and the like. Specific examples are benzoyl peroxide, t-butyloxybenzoate, azobisisobutyronitrile, and the like.

In addition, when the composition of the present invention is light-cured, a photopolymerization initiator, and, as required, a photosensitizer are used. Examples of photopolymerization initiators include 1-hydroxycyclohexylphenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropyl-phenol)-2-hydroxy-2-methylproprane-1-on, 2-hydroxy-2-methylphenylpropane-1-on, thioxanthone, diethylthioxanthone, 2-isopropylthioxanthone, 2-chlorothioxanthone, 2-methyl-1-[4-(methylthio) phenyl 1-2-morpholino-propane-1-on, 2,4,6-trimethylbenzoyldiphenylphosphine oxide, and commercial products such as Irugacure 184, 651, 500, 907, CGI369, CG24-61 (manufactured by Ciba Geigy), Lucirine LA872 8 (manufactured by BASF), Darocure 1116, 1173 (manufactured by Merck), Ubecryl-P3 6 (manufactured by the UCB Co.), and the like. Examples of photosensitizers are triethylamine, diethylamine, Nmethyldiethanolamine, ethanolamine, 4-dimethylaminobenzoic acid, 4-dimethylaminoisomethylbenzoate, 4-dimethylaminoethylbenzoate, 4-dimethylaminoisoamylbenzoate, and commercial products such as Ubecryl-P102, 103, 104, 105 (manufactured by the UCB Co.), and the like.

The amount of polymerization initiator used is from about 0.1 to about 10% of the composition.

Other additives which can be added to the composition of the present invention in addition to the above-mentioned components include epoxy resins, polyamides, polyamidoimides, polyurethanes, polybutadienes, chloroprene, polyethers, polyesters, pentadiene derivatives, styrene/butadiene/styrene block copolymers, styrene/ethylene/butene/styrene block copolymers, styrene/isoprene/styrene block copolymers, petroleum resins, xylene resins, ketone resins, fluorine-type oligomers, silicone-type oligomers, polysulfide-type oligomers, and the like.

Furthermore, the following additives can be incorporated in the composition of the present invention in addition to those listed above, as required: antioxidants, pigments, ultraviolet absorbers, photostabilizers, silane coupling agents, heat polymerization inhibitors, levelling agents, surfactants, preservatives, plasticizers, lubricants, solvents, fillers, age resistors, wettability improvers, coating surface improvers, and the like. Commercial antioxidants which can be used are Irganox 1010, 1035, 1076, 1222 (manufactured by Ciba Geigy), and the like. Commercial ultraviolet absorbers include Tinuvin P234, 320, 326, 327, 328, 213 (manufactured by Ciba Geigy), and the like. Commercial photostabilizers include Tinuvin 292, 144, 622LD (manufactured by Ciba Geigy), Sanol LS770 (manufactured by Sankyo Chemical), and the like. Examples of silane coupling agents which can be given are γ-aminopropyltriethoxysilane, γ-mercaptopropyltrimethoxysilane, y-methacryloxypropyltrimethoxysilane, and commercial products such SH6062, 6030 (manufactured by Toray Silicone), KBE903, 603, 403 (manufactured by Shin-Etsu Chemical), and the like.

The curable liquid resin composition of the present invention can be prepared by blending the above-mentioned components by a conventional manner.

The viscosity of the curable liquid resin compositions of the present invention obtained in this manner is usually 200 to 20,000 cp at 25° C., and preferably 2,000 to 10,000 cp at 25° C.

When the composition of the present invention is used as a primary coating material for optical fiber, the Young's modulus after curing is generally 0.05 to 0.5 kg/m², and preferably 0.06 to 0.13kg/mm². The Young's modulus at −40° to 60° C. is usually 0.01 to 10 kg/mm².

The present invention will now be explained with reference to the following embodiments, which are in no way limitative of the scope of the invention. In the examples below "parts" means "parts by weight".

EXAMPLE I

Synthesis Of Urethane Acrylate A-I

In a reaction vessel equipped with a stirrer, 109.8 gm of 2,4-tolylene diisocyanate, 1 gm of dibutyltindilaurate, and 0.3 gm of 2,6-di-t-butyl-4-methylphenol as a polymerization inhibitor were added. To this, 48.8 gm of hydroxyethylacrylate was added while controlling the temperature to 20° C. or lower. After the addition was completed the mixture was continuously stirred for an additional one hour at 10° to 20° C. Following this, 841.4 gm of a copolymerized diol of ethylene oxide and 1,2-butylene oxide [ethylene oxide:1,2-butylene oxide 1:9 (by weight)] of a number average molecular weight of 2,000 was added while maintaining the temperature in the 40° to 50° C. range, after which the mixture was continuously stirred for 5 hours at 50° to 60° C. to complete the reaction. A urethane acrylate [A-I] of a number average molecular weight of about 4,750 was obtained.

EXAMPLE 2

Synthesis Of Urethane Acrylate A-2

To a reaction vessel equipped with a stirrer, 104.3 gm of 2,4-tolylene diisocyanate, 856.0 gm of a copolymer of ethylene oxide and 1,2-butylene oxide [ethylene oxide: 1,2 butylene oxide 5:95 (by weight)] of a number average molecular weight of 2,000, and 0.3 gm of 2,6-di-t-butylmethylphenol as a polymerization inhibitor were added. To this, 48.8 gm of hydroxyethylacrylate was added while controlling the temperature to 20° C. or less. The mixture was cooled to 15° C. with ice water, after which 1 gm of dibutyl-tin-dilaurate was added to initiate the reaction. The reaction was allowed to continue for 2 hours while maintaining the temperature at 30° to 40° C. Following this, 39.7 gm of 2-hydroxyethylacrylate was added and the mixture was continuously stirred for 5 hours at 50° to 60° C. to complete the reaction. A urethane acrylate [A-2] of a number average molecular weight of about 5,840 was obtained.

EXAMPLE 3

Synthesis Of Urethane Acrylate A-3

To a reaction vessel equipped with a stirrer, 100 gm of ARONIX M113 manufactured by Toagosei Chemicals, 124.7 gm of isophorone diisocyanate, 1 gm of dibutyltindilaurate, and 0.3 gm of 2,6-di-t-butyl-4-methylphenol were added. To this, 842.7 gm of a copolymerized diol of ethylene oxide and 1.2-butylene oxide [ethylene oxide:1,2-butylene oxide =2:8 (by weight)] of a number average molecular weight of 2,000 was added while maintaining the temperature in the 40° to 50° C. range, and the mixture was reacted for 2 hours. Then 32.6 gm of hydroryethylacrylate was added, after which the mixture was continuously stirred for 5 hours at 50° to 60° C. to complete the reaction. A urethane acrylate [A-3] of a number average molecular weight of about 7,120 was obtained.

EXAMPLE 4

Synthesis of Urethane Acrylate A-4

To a reaction vessel equipped with a stirrer, 233.1 gm of 2,4-tolylene diisocyanate, 1 gm of dibutyltindilaurate, and 0.3 gm of 2,6-di-t-butyl-4-methylphenol as a polymerization inhibitor was added. To this, 250.6 gm of 2-hydroxyethylacrylate was added while controlling the temperature to 20° C. or less. After the addition was completed the mixture was continuously stirred for an additional one hour at 10° to 20° C. Following this, 516.8 gm of a copolymerized diol of ethylene oxide and 1,2-butylene oxide [ethylene oxide:1,2-butylene oxide =1:9 (by weight)] of a number average molecular weight of 2,000 was added while maintaining the temperature in the 40° to 50° C. range, after which the mixture was continuously stirred for 5 hours at 50° to 60° C. to complete the reaction. A urethane acrylate [A-4] of a number average molecular weight of about 1,850 was obtained.

EXAMPLE 5

Synthesis of Urethane Acrylate B-2

To a reaction vessel equipped with a stirrer, 104.3 gm of 2,4-tolylene diisocyanate, 1 gm of dibutyltindilaurate, and 0.3 gm of 2,6-di-t-butyl-4-methylphenol as a polymerization inhibitor were added. To this, 856.0 gm of polytetramethylene glycol of a number average molecular weight of 2,000 (commercial product PTG2000 manufactured by Hodogaya Chemical) was added while maintaining the temperature in the 40° to 50° C. range, and reacted for 2 hours. Next, 2-hydroxyethylacrylate was added, after which the mixture was continuously stirred for 5 hours at 50° to 60° C. to complete the reaction. A urethane acrylate [B-2] of a number of average molecular weight of about 5,840 was obtained.

EXAMPLE 6

To a reaction vessel equipped with a stirrer, 55 parts of the urethane acrylate [A-I], 30 parts of ARONIX M113 as a reaction dilution agent, 7 parts of KAYARAD TC110S (manufactured by Nippon Kayaku), 5 parts of vinyl pyrrolidone, 1.5 parts of 2,4,6-trimethylbenzoyldiphenylphosphine oxide, 0.3 parts of Irganox 1035, (manufactured by Ciba Geigy) as antioxidant, 0.1 part of diethylamine as a photosensitizer, and one part of a silane coupling agent (commercial product SH6062 manufactured by Toray Silicone), were added and mixed with stirring at 50° C. to 60° C. to obtain a transparent liquid composition having a viscosity of 2,000 cp at 25° C.

EXAMPLE 7

To a reaction vessel equipped with a stirrer, 55 parts of the urethane acrylate [A-2], 25 parts of ARONIX M113, 12 parts of isobornylacrylate, 5 parts of vinylpyrrolidone, 1.5 parts of 2,4,6-trimethylbenzoyldiphenylphosphine oxide, 0.3 part of Irganox 1035, (manufactured by Ciba Geigy), 0.1 part of diethylamine, and one part of SH6062, were added and mixed with stirring at 50° to 60° C. to obtain a transparent liquid composition with a viscosity of 2,500 cp at 25° C.

EXAMPLE 8

To a reaction vessel equipped with a stirrer, 60.5 parts of the urethane acrylate [A-3], 37 parts of ARONIX M113, 12 parts of isobornylacrylate, 5 parts of vinylpyrrolidone, 1.5 parts of 2,4,6-trimethylbenzoyldiphenylphosphine oxide, 0.3 part of Irganox 1035, (manufactured by Ciba Geigy), were added and mixed with stirring at 50° to 60° C. to obtain a transparent liquid composition with a viscosity of 2,700 cp at 25° C.

EXAMPLE 9

To a reaction vessel equipped with a stirrer, 60 parts of the urethane acrylate [A-4], 20 parts of tricyclodecanedimethanoldiacrylate, 10 parts of isobornylacrylate, 10 parts of N-vinylpyrrolidone, 1.5 parts of 2,4,6-trimethylbenzoyldiphenylphosphine oxide, 0.3 part of Irganox 1035 were added and mixed with stirring at 50° to 60° C. to obtain a transparent liquid composition with a viscosity of 6,000 cp at 25° C.

Comparative Example 1

A liquid composition was prepared in exactly the same manner as Example 6 except that 55 parts of the urethane acrylate [B-1] were used instead of the urethane acrylate [A-1]. A transparent liquid composition having a viscosity of 3,000 cp at 25° C. was obtained.

To a reaction vessel equipped with a stirrer, 109.8 gm of 2,4-tolylene diisocyanate, 1 gm of dibutyltindilaurate, and 0.3 gm of 2,6-di-t-butyl-4-methylphenol as a polymerization inhibitor were added. To this, 48.8 gm of 2-hydroxyethylacrylate was added while controlling the temperature to 20° C. or less. After the addition was completed the mixture was continuously stirred for an additional one hour at 10° to 20° C. Following this, 841.4 gm of polypropylene glycol of a number average molecular weight of 2,000 (commercial product PPG2000 manufactured by Asahi-Olin) was added while maintaining the temperature in the 40° to 50° C. range, after which the mixture was continuously stirred for 5 hours at 50° to 60° C. to complete the reaction. A urethane acrylate [B-1] of a number of average molecular weight of about 4,750 was obtained.

(2) Measurement Of Young's Modulus (conforming to JIS K7113 Standard)

The Young's modulus of the test leaves was measured in a tension tester at 23° C. at a drawing rate of 1 mm/min and a bench mark distance of 25 mm.

(3) Gel Proportion

The initial weight (Wo) of the cured film was measured, then the film was extracted for 12 hours in a Soxhlet extraction flask using methyl ethyl ketone as a solvent. After extraction, the film was dried in a vacuum drier at 50° C. for 12 hours, then after standing for one hour at room temperature the dry weight (W1) was measured.

The gel proportion was obtained from the following formula.

Gel proportion=W1/Wo×100 (%)

(4) Heat Resistance Test

The cured film obtained by irradiation with ultraviolet light at 500 mJ/cm$^2$ was held in a thermostat at 120° C. for 15 days. The Young's modulus and gel proportion of the film were then measured.

TABLE 1

|  | Example 6 | Example 7 | Example 8 | Comparative Example 1 | Comparative Example 2 |
| --- | --- | --- | --- | --- | --- |
| Initial Evaluation | | | | | |
| Young's Modulus (kg/mm$^2$) | | | | | |
| Irradiation 25 mJ/mm$^2$ | 0.06 | 0.07 | 0.06 | 0.04 | 0.11 |
| Irradiation 500 mJ/mm$^2$ | 0.07 | 0.07 | 0.06 | 0.08 | 0.18 |
| Gel Proportion (%) | | | | | |
| Irradiation 25 mJ/mm$^2$ | 88 | 90 | 88 | 82 | 85 |
| Irradiation 500 mJ/mm$^2$ | 89 | 91 | 89 | 88 | 90 |
| After Heat Test | | | | | |
| Young's Modulus (kg/mm$^2$ | | | | | |
| Irradiation 500 mJ/mm$^2$ | 0.05 | 0.06 | 0.05 | 0.02 | 0.15 |
| Gel Proportion (%) | | | | | |
| Irradiation 500 mJ/mm$^2$ | 86 | 87 | 86 | 50 | 87 |

Comparative Example 2

A liquid composition was prepared in exactly the same manner as Example 7 except that 55 parts of the urethane acrylate [B-2] were used instead of the urethane acrylate [A-2]. A transparent liquid composition of a viscosity having 11,000 cp at 25° C. was obtained.

I. Film Tests

Using the liquid compositions obtained as outlined above, test leaves were fabricated and evaluated as explained below. The results are shown in Table 1.

(1) Test Leaf Fabrication

Using a 150 μm applicator, the various liquid compositions were each applied to glass plates and cured films were obtained by irradiation with ultraviolet-rays at 25 mJ/cm$^2$ or 500 mJ/cm$^2$. The cured films were peeled from the glass plate and conditioned for 24 hours at a temperature of 23° C. and 50% RH, to obtain the test leaves.

II. Drawing Tests

Using an optical fiber drawing machine and the compositions obtained as described above, two layers of coatings in the combinations shown in Table 3 were applied to test optical fibers, which were then cured by irradiation with ultraviolet rays to obtain coated optical fibers, the average optical fiber diameter of the cores of the coated optical fibers was about 125 μm; the average diameter of the coated optical fiber after the primary layer had been applied and cured was 200 μm; and the average diameter after the secondary layer had been applied and cured was 250 μm.

The coated optical fibers were prepared at three different drawing rate levels of 180, 360, and 720 m/min and evaluated using the following procedures. Results are shown in Table 2.

(1) Gel Proportion

A section of coated optical fiber 4 cm long was cut off as a test sample and the initial eight (Wo) measured. This test sample was extracted for 12 hours in a Soxhlet extraction flask using methyl ethyl ketone as a solvent.

After extraction, the coated optical fiber test sample was dried in a vacuum drier at 50° C. for 12 hours, then after standing for one hour at room temperature the dry weight (W1) was measured.

The coated optical fiber sample was then calcined in an electric furnace for 30 minutes at 700° C. to remove both coating layers. The weight (WF) of the recovered optical fiber only was measured. The gel proportion of the coating layers of the coated optical fiber was obtained from the following formula:

$$\text{Gel proportion} = \frac{W1 - WF}{Wo - WF} \times 100$$

(2) Environment Tests

1) Resistance To Light

The coated optical fiber which had been formed by drawing at 360 m/min was placed under 2,000 lux fluorescent lighting for 30 days, after which the sample was evaluated for change in external appearance, change in weight, and amount of hydrogen gas generated.

(Evaluation Methods)

(a) Change in External Appearance

The boundary between the coating and the fiber was examined with a microscope for the presence of cavities, exfoliation, drops of liquid, and foreign matter.

(b) Change in Weight

The change in weight occurring in the sample on exposure to fluorescent light was determined by the following method.

Weight of coated fiber prior to exposure =Wa

Weight of coated fiber after exposure =Wb

Weight of recovered coated fiber only after removal of coatings by calcining irradiated coated fiber for 30 min in an electric furnace at 700C=Wf $$\text{Change in weight} = \frac{Wb - Wa}{Wa - Wf} \times 100$$

(c) Amount of Hydrogen Gas Generated.

The volume of coated fiber was accurately weighed then placed in a vial of a known volume and heated at 100° C. for 4 hours. Next, the gas from the headspace of the vial was collected using a gas-tight syringe, introduced into a gas chromatograph, and the amount of hydrogen gas generated was measured. The measurement was made using the absolute calibration curve method.

TABLE 2

|  | Test 1 | Test 2 | Test 3 |
|---|---|---|---|
| Combination of Coating Materials Compositions |  |  |  |
| Primary Soft Material | Ex. 6 | Ex. 7 | Ex. 8 |
| Secondary Hard Material | Ex. 9 | Ex. 9 | Ex. 9 |

TABLE 2-continued

|  | Test 1 | Test 2 | Test 3 |
|---|---|---|---|
| Evaluation Results |  |  |  |
| 1. Gel Proportion Drawing Rate (m/min) |  |  |  |
| 180 | 90 | 90 | 90 |
| 360 | 90 | 90 | 90 |
| 720 | 90 | 90 | 90 |
| 2. Environment Test |  |  |  |
| Resistance to Light Change in Appearance | No | No | No |
| Change in Weight (%) | −0.5 | −0.2 | −0.3 |
| $H_2$ Generation (μ l/g) |  |  |  |
| Before Test | 0.2 | 0.2 | 0.2 |
| After Test | 5 | 6 | 4 |

EXAMPLE 10

Synthesis of Urethane Acrylate C-1

To a reaction vessel equipped with a stirrer, 100 gm of ARONIX M113 manufactured by Toagousei Chemicals, 124.7 gm of isophorone diisocyanate, 1 gm of dibutyltindilaurate, and 0.3 gm of 2,6-di-t-butyl-4-methylphenol were added. To this, 842.7 gm of a copolymerization diol of ethylene oxide and 1,2-propylene oxide [ethylene oxide: 1,2 propylene oxide=2:8 (by weight)] of a number average molecular weight of 2,000 was added while maintaining the temperature in the 40° to 50° C. range, and the mixture was reacted for 2 hours. Then 32.6 gm of hydroxyethylacrylate was added, after which the mixture was continuously stirred for 5 hours at 50° to 60° C. to complete the reaction. A urethane acrylate [C-1] of a number average molecular weight of about 7,120 was obtained.

EXAMPLE 11

Synthesis of Urethane Acrylate C-2

To a reaction vessel equipped with a stirrer, 100 gm of ARONIX M113 manufactured by Toagousei Chemicals, 124.7 gm of isophorone diisocyanate, 1 gm of dibutyltindilaurate, and 0.3 gm of 2,6-di-t-butyl-4-methylphenol were added. To this, 842.7 gm of a copolymerization diol of 1,2-propylene oxide and 1,2-butylene oxide [1,2 propylene oxide: 1,2-butylene oxide= 2:8 (by weight)] of a number average molecular weight of 2,000 was added while maintaining the temperature in the 40° to 50° C. range, and the mixture was reacted for 2 hours. Then 32.6 gm of hydroxyethylacrylate was added, after which the mixture was continuously stirred for 5 hours at 50° to 60° C. to complete the reaction. A urethane acrylate [C-2] of a number average molecular weight of about 7,120 was obtained.

Comparative Example 3

To a reaction vessel equipped with a stirrer, 60.5 parts of the urethane acrylate [C-1], 37 parts of ARONIX M113, 12 parts of isobornylacrylate, 5 parts of vinylpyrrolidone, 1.5 parts of 2,4,6-trimethylbenzoyldiphenylphosphineoxide, 0.3 parts of Irganox 1035, (manufactured by Ciba Geigy), were added and mixed with stirring at 50° to 60° C. to obtain a transparent liquid composition with a viscosity of 3200 cp at 25° C.

Comparative Example 4

To a reaction vessel equipped with a stirrer, 60.5 parts of the urethane acrylate [C-2], 37 parts of ARONIX M113, 12 parts of isobornylacrylate, 5 parts of vinylpyrrolidone, 1.5 parts of 2,4,6-trimethylbenzoyldiphenylphosphineoxide, 0.3 parts of Irganox 1035, (manufactured by Ciba Geigy), were added and mixed with stirring at 50° to 60° C. to obtain a transparent liquid composition with a viscosity of 3200 cp at 25° C.

I. Film Tests

Using the liquid compositions obtained as outlined above, test leaves were fabricated and evaluated as explained below. The results are shown in Table 3.

(1) Test Leaf Fabrication

Using a 150 μm applicator, the various liquid compositions were each applied to glass plates and cured films were obtained by irradiation with ultraviolet-rays at 25 mJ/cm$^2$ or 500 mJ/cm$^2$. The cured films were peeled from the glass plate and conditioned for 24 hours at a temperature of 23° C. and 50% RH, to obtain the test leaves.

(2) Measurement Of Young's Modulus (conforming to JIS K7113 Standard)

The Young's modulus of the test leaves was measured in a tension tester at 23° C. at a drawing rate of 1 mm/min and a bench mark distance of 25 mm.

(3) Gel Proportion

The initial weight (Wo) of the cured film was measured, then the film was extracted for 12 hours in a Soxhlet extraction flask using methyl ethyl ketone as a solvent. After extraction, the film was dried in a vacuum drier at 50° C. for 12 hours, then after standing for one hour at room temperature the dry weight (W1) was measured.

The gel proportion was obtained from the following formula.

Gel proportion=W1/Wo×100 (%)

(4) Heat Resistance Test

The cured film obtained by irradiation with ultraviolet light at 500 mJ/cm$^2$ was held in a thermostat at 120° C. for 15 days. The Young's modulus and gel proportion of the film were then measured.

(5) UV Light Resistance

The accelerated UV light resistance was conducted on each cured film obtained by irradiation with ultraviolet light at 500 mJ/cm$^2$ using a QUV accelerated weathering tester manufactured by Q-Panel Co. The test condition to which each cured film was exposed for a time period of 72 hours were a temperature of 40° C., a UV wavelength as provided by a B-lamp, a UV dosage of 60 J/cm$^2$ per hour as measured by a UV-35 sensor commercially available from ORC-Manufacturing and a relative humidity of 50%. Gel proportion of the film were then measured.

TABLE 3

| Polyol | Ex. 8 EO/BO$^1$ 2/8 | Comp. Ex. 3 EO/PO$^2$ 2/8 | Comp. Ex. 4 PO/BO$^3$ 2/8 |
|---|---|---|---|
| Initial Evaluation | | | |
| Young's modulus (kg/mm2) Irradiation at 25 mJ/cm2 | 0.06 0.06 | 0.03 0.07 | 0.05 0.07 |
| Gel Proportion (%) | | | |
| Irradiation at 25 mJ/cm2 | 88 | 80 | 85 |
| Irradiation at 500 mJ/cm2 | 89 | 89 | 88 |
| After Heat Aging Test | | | |
| Young's modulus (kg/mm2) Irradiation at 500 mJ/cm2 | 0.05 | 0.02 | 0.03 |
| Gel Proportion (%) | | | |
| Irradiation at 500 mJ/cm2 | 86 | 58 | 63 |
| After UV Resistance Test | | | |
| Gel proportion (%) Irradiation at 500 mJ/cm2 | 75 | 50 | 55 |

$^1$EO/BO = Ethylene Oxide/Butylene Oxide
$^2$EO/PO = Ethylene Oxide/Propylene Oxide
$^3$PO/BO = Propylene Oxide/Butylene Oxide From the results of above heat resistance test and UV light resistance, it is clear that EO/BO copolymerization diol shows better heat resistance and UV light resistance than EO/PO and PO/BO copolymerization diols.

The curable liquid resin compositions of the present invention have a high curing speed. The cured material has both a low Young's modulus and a high gel proportion, shows superior resistance to heat and light, and produces only small amounts of hydrogen gas. It is therefore superior as a coating material for optical fiber.

The compositions of the present invention are not merely a coating material for optical fiber. Because they have superior heat resistance, and superior curing and adherence characteristics, they are useful as a coating material for various types of substrates such as metal, plastics, wood, porcelain, and glass, and also finds application as an optical molding material, three-dimension molding material, printing plate material, and the like.

We claim:

1. A curable liquid resin composition for making a urethane (meth)acrylate polymer that comprises:

(A) a polyol compound consisting of the structural unit groups

and

(B) a polyisocyanate compound; and
   (C) at least one (meth)acrylate compound containing a hydroxyl group, wherein the weight ratio of the structural unit groups —CH$_2$CH$_2$O—/—CH$_2$CH(CH$_2$CH$_3$)O— is 2–50/20–98.

2. A composition as in claim 1 wherein the number average molecular weight of the polyol is in the range of from about 200 to about 10,000.

3. A composition as in claim 1 that contains from about 1.1 to about 3 equivalents by weight of the isocyanate group contained in the polyisocyanate compound and from about 0.1 to about 1.5 equivalents by weight of the hydroxyl group of the (meth)acrylate compound to one equivalent by weight of the hydroxyl group contained in the polyol compound.

4. A composition as in claim 1 that further contains from about 0.01 to about 1.0 parts by weight of urethanation catalyst to 100 parts by weight of the reactants in the composition.

5. A composition as in claim 1 wherein the number average molecular weight of the urethane (meth)acrylate polymer is from about 700 to about 20,000.

6. A composition as in claim 1 that further comprises at least one reaction dilution agent.

7. A composition as in claim 1 that further comprises a photopolymerization initiator.

8. A composition as in claim 7 that further comprises a photosensitizer.

9. A composition as in claim 1, wherein the weight ratio of the structural unit groups —CH$_2$CH$_2$O—/—CH$_2$CH(CH$_2$CH$_3$)O— is 2–50/50–98.

10. A composition as in claim 1, wherein —CH$_2$CH$_2$O— is found in the polyol in the range of from about 2 to about 80 weight % and —CH$_2$CH(CH$_2$CH$_3$)O— is found in the polyol in the range of from about 20 to about 98 weight % wherein the weight % is based upon the total weight of the polyol.

11. A composition as in claim 1 wherein —CH$_2$CH$_2$O— is found in the polyol in the range of from about 10 to about 30 weight % and —CH$_2$CH(CH$_2$CH$_3$)O— is found in the polyol in the range of from about 70 to about 90 weight % wherein the weight % is based upon the total weight of the polyol.

12. A composition as in claim 1 wherein —CH$_2$CH$_2$O— is found in the polyol in the range of from about 20 to about 30 weight % and —CH$_2$CH(CH$_2$CH$_3$)O— is found in the polyol in the range of from about 70 to about 80 weight % wherein the weight % is based upon the total weight of the polyol.

13. A urethane (meth)acrylate polymer that comprises the reaction product of:

(a) a polyol compound consisting of the structural unit groups

—CH$_2$CH$_2$O— and

—CH$_2$CH(CH$_2$CH$_3$)O—;

(B) a polyisocyanate compound; and (C) at least one (meth)acrylate compound containing a hydroxyl group, wherein the weight ratio of the structural unit groups —CH$_2$CH$_2$O—/—CH$_2$CH(CH$_2$CH$_3$)O— is 2–50/20–98.

14. A coated article comprising a substrate having a coating comprising the composition of claim 1.

15. A coated article as in claim 14 wherein the substrate is an optical fiber.

16. A method of preparing a coated article comprising applying the composition of claim 7 to a substrate and exposing said composition to a dose of ultraviolet radiation that is sufficient to cure said composition.

* * * * *